(12) United States Patent
Lee

(10) Patent No.: US 7,831,700 B2
(45) Date of Patent: Nov. 9, 2010

(54) DISTRIBUTED PCE-BASED SYSTEM AND ARCHITECTURE IN MULTI-LAYER NETWORK

(75) Inventor: Young Lee, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 438 days.

(21) Appl. No.: 11/549,740

(22) Filed: Oct. 16, 2006

(65) Prior Publication Data

US 2008/0091809 A1    Apr. 17, 2008

(51) Int. Cl.
*G06F 15/173* (2006.01)
(52) U.S. Cl. .................. 709/223; 370/254; 370/401; 370/405; 370/406
(58) Field of Classification Search .......... 709/223; 370/254, 401, 405, 406
See application file for complete search history.

(56) References Cited

U.S. PATENT DOCUMENTS

| | | | |
|---|---|---|---|
| 5,680,580 A | 10/1997 | Beardsley et al. | |
| 5,872,918 A | 2/1999 | Malomsoky et al. | |
| 6,807,179 B1 | 10/2004 | Kanuri et al. | |
| 7,426,562 B1* | 9/2008 | Johri .................. | 709/226 |
| 2001/0012298 A1* | 8/2001 | Harshavardhana et al. .. | 370/405 |
| 2003/0217129 A1 | 11/2003 | Knittel et al. | |
| 2004/0081105 A1 | 4/2004 | Shimazaki et al. | |
| 2005/0111349 A1 | 5/2005 | Vasseur et al. | |
| 2006/0023587 A1 | 2/2006 | Kim | |
| 2006/0039391 A1* | 2/2006 | Vasseur et al. .............. | 370/409 |
| 2006/0098657 A1 | 5/2006 | Vasseur et al. | |
| 2006/0101142 A1 | 5/2006 | Vasseur et al. | |
| 2006/0212556 A1 | 9/2006 | Yacoby et al. | |
| 2006/0268682 A1 | 11/2006 | Vasseur | |
| 2007/0019558 A1* | 1/2007 | Vasseur et al. .............. | 370/248 |
| 2007/0058568 A1* | 3/2007 | Previdi et al. ............... | 370/254 |

FOREIGN PATENT DOCUMENTS

| | | |
|---|---|---|
| CN | 1866852 A | 11/2006 |
| CN | 1870570 A | 11/2006 |
| JP | 2004129135 A | 4/2004 |

(Continued)

OTHER PUBLICATIONS

George Swallow, MPLS advantages for Traffic Engineering, 1999, Cisco Systems.*

(Continued)

*Primary Examiner*—Ashok B Patel
*Assistant Examiner*—Andrew Goldberg
(74) *Attorney, Agent, or Firm*—Conley Rose, P.C.; Grant Rudolph

(57) ABSTRACT

A distributed path computation element based system in a multi-layer network. The system comprises at least one higher-layer path computation element, and at least one lower-layer path computation element, adapted to provide dynamic multi-layer path computations; at least one higher-layer traffic engineering database, and at least one lower-layer traffic engineering database, adapted to provide multi-layer traffic engineering label switched paths, while maintaining layer-specific traffic engineered database in a distributed fashion; and at least one path computation element agent, adapted to provide static optical layer path provisioning, and reconfiguration of optical layer label switched paths in cooperation with the at least one lower-layer path computation element.

30 Claims, 4 Drawing Sheets

FOREIGN PATENT DOCUMENTS

WO            2005107192 A1      11/2005

OTHER PUBLICATIONS

Eiji Oki, Framework for PCE-Based Inter-Layer MPLS and GMPLS Traffic Engineering, Apr. 2006, pp. 1-31.*

A. Farrel, A path Computation Element (PCE)-Based Architecture, Aug. 2006, pp. 1-51.*

Kohei Shiomoto, Requirements for GMPLS-based multi-rejoin and multi-layer network (MRN/MLN), Jan. 2006, pp. 1-41.*

Eiji Oki, "Definition of Virtual Network Topology Manager (VNTM) for PCE-based Inter-Layer MPLS and GMPLS Traffic Engineering", Jun. 2006, IETF, Pages: All.*

Lee, Young; "System of Path Computation Element Protocol Support for Large-Scale Concurrent Path Computations"; U.S. Appl. No. 11/549,756, filed Oct. 16, 2006; Specification 27 pgs.; 2 Drawing Sheets (Figures 1-2).

Oki, Eiji, et al.; "Framework for PCE-Based Inter-Layer MPLS and GMPLS Traffic Engineering"; Network Working Group; Jun. 2006; 17 pgs.

Vasseur; J.P., et al.; "Path Computation Element (PCE) Communication Protocol (PCEP)"; Version 1; Network Working Group; Jun. 22, 2006; 56 pgs.

Farrel; A. , et al.; "A Path Computation Element (PCE)—Based Architecture"; Network Working Group; Aug. 2006; 38 pgs.

Ash, J., et al.; "Path Computation Element (PCE) Communication Protocol Generic Requirements"; Network Working Group; Sep. 2006; 20 pgs.

Shiomoto, Kohei, et al.; Requirements for GMPLS-Based Multi-Region and Multi-Layer Networks (MRN/MLM); Network Working Group; Oct. 2006; 21 pgs.

Foreign Communication From a Related Counterpart Application—Supplementary European Search Report, EP 07764273.4, Dec. 8, 2008, 12 pages.

Foreign Communication From a Related Counterpart Application—International Search Report and Written Opinion, PCT/CN2007/070408, Nov. 8, 2007, 8 pages.

Oki, Eiji, et al., "Requirements for Path Computation Element in GMPLS and IP/MPLS Networks," draft-oki-pce-gmpls-req-01.txt, IETF Network Working Group, Internet Draft, Oct. 2004, 26 pgs.

Oki, Eiji, et al., "Performance Evaluation of Dynamic Multi-Layer Routing Schemes in Optical IP Networks," IEICE Trans. Commun., vol. E87-B, No. 6, Jun. 2004, pp. 1577-1583.

Oki, Eiji, et al., "Dynamic Multilayer Routing Schemes in GMPLS-Based IP +Optical Networks," IEEE Communications Magazine, Jan. 2005, pp. 108-114.

Sato, Ken-Ichi, et al., "GMPLS-Based Photonic Multilayer Router (Hikari Router) Architecture: An Overview of Traffic Engineering and Signaling Technology," IEEE Communications Magazine, Mar. 2002, pp. 96-101.

Awduche; D., et al.; "RSVP-TE: Extensions to RSVP for LSP Tunnels"; Network Working Group; Dec. 2001; 57 pgs.

Bradner, S.; "Key Words for Use in RFCs to Indicate Requirement Levels"; Network Working Group; Mar. 1997; 3 pgs.

Le Roux, J. L.; "Requirements for Path Computation Element (PCE) Discovery"; Network Working Group; Jun. 2006; 19 pgs.

Lee, Y., et al.; "Path Computation Element Communication Protocol (PCECP) Requirements for Support of Global Concurrent Optimization"; draft-lee-pce-global-concurrent-optimization-00.txt; Oct. 11, 2006; 16 pgs.

PCT International Search Report; PCT/CN2007/070910; Jan. 24, 2008; 5 pgs.

PCT Written Opinion of the International Searching Authority; PCT/CN2007/070910; Jan. 24, 2008; 9 pgs.

Office Action dated Feb. 5, 2009, U.S. Appl. No. 11/549,756, filed Oct. 16, 2006, 22 pages.

Le Roux, J.L., et al. "IS-IS Protocol Extensions for Path Computation Element (PCE) Discovery," Network Working Group, Internet Draft, draft-ietf-pce-disco-proto-isis-00,txt, Sep. 2006, 21 pgs.

Le Roux, J.L., et al. "OSPF Protocol Extensions for Path Computation Element (PCE) Discovery," Network Working Group, Internet Draft, draft-ietf-pce-disco-proto-ospf-00,txt, Sep. 2006, 24 pgs.

Vasseur, JP, et al. "A Backward Recursive PCE-based Computation (BRPC) Procedure to Compute Shortest Inter-Domain Traffic Engineering Label Switched Paths," Network Working Group, Internet-Draft, draft-ietf-pce-brpc-00,txt, Aug. 31, 2006, 16 pgs.

Office Action dated Jun. 15, 2009, U.S. Appl. No. 11/549,756, filed Oct. 16, 2006, 22 pages.

Office Action dated Dec. 2, 2009, U.S. Appl. No. 11/549,756, filed Oct. 16, 2006, 25 pages.

Foreign Communication from a Related Application—European Supplementary Search Report—EP application No. 07817101.4, Sep. 7, 2009, 7 pages.

Office Action dated Jul. 8, 2010, U.S. Appl. No. 11/549,756, filed Oct. 16, 2006, 19 pages.

* cited by examiner

DISTRIBUTED PCE-BASED SYSTEM AND ARCHITECTURE IN MULTI-LAYER NETWORK

CROSS-REFERENCE TO RELATED APPLICATIONS

This application is related U.S. patent application Ser. No. 11/549,756, filed concurrently with the present invention on Oct. 16, 2006, entitled "SYSTEM OF PATH COMPUTATION ELEMENT PROTOCOL SUPPORT FOR LARGE-SCALE CONCURRENT PATH COMPUTATIONS", by Young Lee.

TECHNICAL FIELD OF THE INVENTION

The present invention relates generally to telecommunications, and more particularly, to a distributed Path Computation Element based (PCE-based) system and architecture in a multi-layer network.

BACKGROUND OF THE INVENTION

A Path Computation Element (PCE) is an entity that is capable of computing a network path or route based on a network topology, and applying computational constraints to the computation. The capability of a PCE to compute different types of paths allows a PCE to provide traffic engineering functions.

Constraint-based path computation is a fundamental building block for traffic engineering networks. However, in these kind of networks, path computation is complex, and may require special computational components and cooperation between different network domains.

A PCE-based network architecture defines PCEs to perform computations of a multi-layer path, and take constraints into consideration. A multi-layer network may be considered as distinct path computation regions within a PCE domain, and therefore, a PCE-based architecture is useful to allow path computation from one layer network region, across the multi-layer network, to another layer network region. A PCE may be placed on a single network node with high processing capabilities, or several PCEs may be deployed on nodes across a network.

A distributed PCE model may refer to a domain or network that may include multiple PCEs, and where computations of paths are shared among the PCEs. A given path may in turn be computed by a single, or multiple PCEs. A PCE agent may be linked to a particular PCE or may be able to choose freely among several PCEs.

To address the complexity of path computations in multi-layer networks, there is a need for a PCE-based system in multi-layer networks, which provides efficient, correct and optimal path computations.

SUMMARY OF THE INVENTION

The present invention provides a distributed Path Computation Element based (PCE-based) system in a multi-layer network. The system comprises at least one higher-layer Path Computation Element (PCE); at least one lower-layer PCE; at least one higher-layer Traffic Engineering Database (TED), adapted to provide all relevant Traffic Engineering (TE) link information to the at least one higher-layer PCE; at least one lower-layer TED, adapted to provide all relevant Traffic Engineering link information to the at least one lower-layer PCE; and at least one Path Computation Element Agent (PCE Agent), adapted to manage path computations.

The distributed higher-layer and lower-layer PCEs, in the present invention, provide functions separately, and also cooperatively, for multi-layer path computations. The higher-layer and lower-layer TEDs provide TE link information to be able to compute multi-layer traffic engineering Label Switched Paths (LSPs), while maintaining layer-specific traffic engineered database in a distributed fashion.

The PCE Agent, in the present invention, is adapted to provide static optical layer path provisioning, and reconfiguration of optical layer LSPs in cooperation with the at least one lower-layer PCE.

The present invention provides a static optical layer path provisioning mode, to establish optical LSPs on a pre-establishment basis. In addition, the present invention provides a dynamic multi-layer path provisioning mode, to dynamically establish an LSP, with cooperation between higher-layer and lower-layer PCEs.

The present invention further provides a crankback hold-off mechanism, to establish a dynamic light path upon detection of a crankback condition in an optical transport layer LSP.

The following description and drawings set forth in detail a number of illustrative embodiments of the invention. These embodiments are indicative of but a few of the various ways in which the present invention may be utilized.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

The following discussion is presented to enable a person skilled in the art to make and use the invention. The general principles described herein may be applied to embodiments and applications other than those detailed below without departing from the spirit and scope of the present invention as defined herein. The present invention is not intended to be limited to the embodiments shown, but is to be accorded the widest scope consistent with the principles and features disclosed herein.

Figure 1:
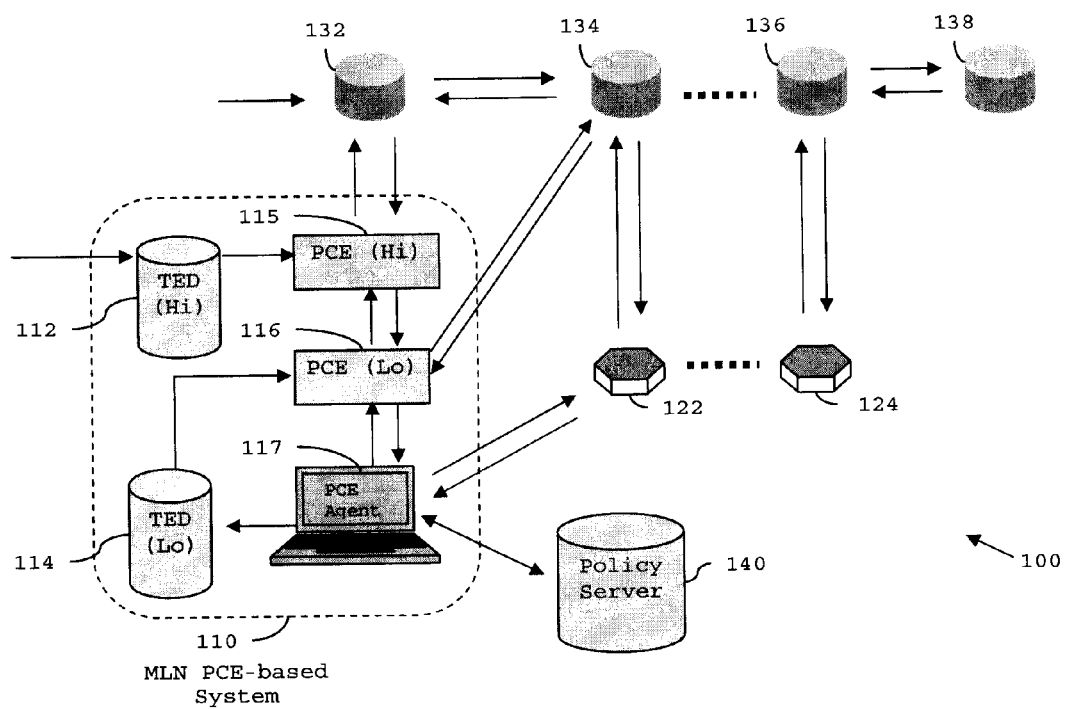
FIG. 1 depicts an embodiment of a distributed path computation element based multi-layer network architecture according to the present invention.

Referring now to drawings, and initially to FIG. 1, an embodiment of a distributed Path Computation Element based (PCE-based) multi-layer network architecture (100) is illustrated according to the present invention. The Multi-Layer Network (MLN) PCE-based system (110) may be taken as an independent server (i.e., an external entity) from the perspective of other network nodes.

MLN PCE-based system (110) includes a PCE (Hi) (115) and a PCE (Lo) (116), distributed in a higher-layer and a lower-layer of a multi-layer network, respectively. PCE (115) and (116) function separately, but operate in a cooperative manner to provide multi-layer traffic engineered path computations. There may be multiple PCEs (115) and PCEs (116). Each PCE (115) may communicate with each PCE (116). PCE (115) may be seen as a client to PCE (116), which provides a lower-layer path computation service responsive to a request of PCE (115). There may be multiple PCEs (Hi) and PCEs (Lo). Each PCE (Hi) may communicate with each PCE (Lo). PCE (115) may be seen as a client to PCE (116), which provides a lower-layer path computation service responsive to a request of PCE (115).

PCE (116) may be used to compute optical layer Label Switched Paths (LSPs) (e.g., optical channel/Lambda layer), and PCE (115) may be used to compute packet layer LSPs (e.g., Internet Protocol/Multiprotocol Label Switching layer). PCE (115) and PCE (116) cooperate for an end-to-end multi-layer path computation. PCE (116) may provide pre-established Optical-LSP information upon a request of PCE (115), which is referred to as a Static Optical Layer Path Provisioning (SOLPP) Mode. PCE (116) may also provide dynamically a new light path computation upon a request of an Area Border Router (ABR), which is referred to as a Dynamic Multi-Layer Path Provisioning (DMLPP) Mode.

MLN PCE-based system (110) includes two layer specific Traffic Engineering Database (TED) for each layer: TED (Hi) (112) and TED (Lo) (114). TED (112) provides all relevant Traffic Engineering (TE) link information to PCE (115), and TED (114) provides all relevant TE link information to PCE (116). When there are multiple PCEs (115) and PCEs (116), each PCE (115) is connected to a TED (112), and each PCE (116) is connected to a TED (114).

PCE Agent (117) in MLN PCE-based system (110) is an enabler of MLN PCE-based system (110) performing many functions. PCE Agent (117) is basically a management component that interacts with PCE (116) for optical transport LSP provisioning.

PCE Agent (117) may be any client application, requesting a path computation to be performed by a PCE. There are numbers of functions PCE Agent (117) may facilitate, in order to provide a complete solution in MLN Traffic Engineering. PCE Agent (117) plays a central role in MLN PCE-based system (110) providing a brain of the system.

In one embodiment, PCE Agent (117) may provide path provisioning of lower layer LSPs (i.e., Optical LSPs). PCE Agent (117) initiates LSP setup in a lower layer. This may be an off-line provisioning process that may be viewed a part of a network planning function. Trigger for the path provisioning is not a dynamic trigger from a higher-layer. Trigger for the path provisioning may be driven by network planning. PCE Agent (117) may initiate a global concurrent path computation to PCE (116) using a traffic demand matrix.

In an alternative embodiment, PCE Agent (117) interacts with PCE (116) for computation of lower-layer LSPs. PCE Agent (117) plays as a Path Computation Client (PCC) to PCE (116) for lower-layer LSPs. In one embodiment, upon receipt of a traffic demand, PCE Agent (117) derives a point-to-point traffic matrix that will be an input to PCE (116). PCE Agent (117) may be adapted to formulate a global concurrent path computation request to PCE (116). PCE Agent (117) interacts with a PCE Policy Server (140) to derive all decision parameters required in a global concurrent path computation. The decision parameters may include global objective functions, or global constraints, etc.

Alternatively, PCE Agent (117) may have intelligence to perform iterative path computation when an initial global concurrent path computation fails. PCE Agent (117) may have ability to partition one single N concurrent path computation requests into M sessions; or to correlate M sessions and interact with PCE (116) to avoid double booking during an iterative path computation mode. PCE Agent (117) may also derive a point-to-multi-point traffic matrix for point-to-multi-point applications, when PCE (116) has ability to compute point-to-multi-point paths.

In another embodiment, PCE Agent (117) may perform reconfiguration of Optical LSPS (O-LSPs). PCE Agent (117) may provide an automatic reconfiguration detection mechanism. The reconfiguration detection mechanism may detect under-utilized O-LSPS and well-performing O-LSPS using a periodic polling mechanism. The reconfiguration detection mechanism may also run a reconfiguration algorithm to determine candidates for reconfigured/re-optimized O-LSPS.

Furthermore, the reconfiguration detection mechanism may be used to initiate a re-optimization path computation request to PCE (116) for under-utilized O-LSPs. In addition, the reconfiguration detection mechanism may provide constraints to PCE (116) in a path re-optimization computation request. The constraints may include new objective functions, list of paths to be re-optimized, or list of paths that may not be removed/changed. The list of paths that may not be removed/changed may be placed as a global constraint in a path computation request.

Communications between PCE (115) and PCE (116), and between PCE (116) and PCE Agent (117), are through PCE Communication Protocol (PCECP). When receiving a signaling request to end at an Egress Node (138), an Ingress Node (132) communicates with PCE (115) through PCECP, asking for a path computation. PCE (115) may communicate with PCE (116) for lower-layer path information, and returns a computed path to Ingress Node (132). Ingress Node (132) then proceeds a signaling procedure using the computed path, and reaches Egress Node (138) by passing through Area Border Router (ABR) (134) and (136). ABR (134) and (136) may also be an Autonomous System Border Router (ASBR).

ABR (134) may request PCE (116) to provide a light path via PCECP, when a computed path arriving at ABR (134) from Ingress Node (132) is infeasible, or when information of a computed path is not sufficient. PCE Agent (117) may provide static optical layer path provisioning with cooperation of PCE (116), establishing optical LSPs by communicating with optical gateway nodes (122) and (124).

The distributed PCE-based architecture in the present invention fits well in inter-domain multi-layer applications (i.e., a higher-layer service provider is different from a lower-layer service provider, e.g., carrier's carrier applications). The distributed PCE-based architecture also facilitates vertical integration of two separate service administrative domains in a provider's network.

Figure 2:
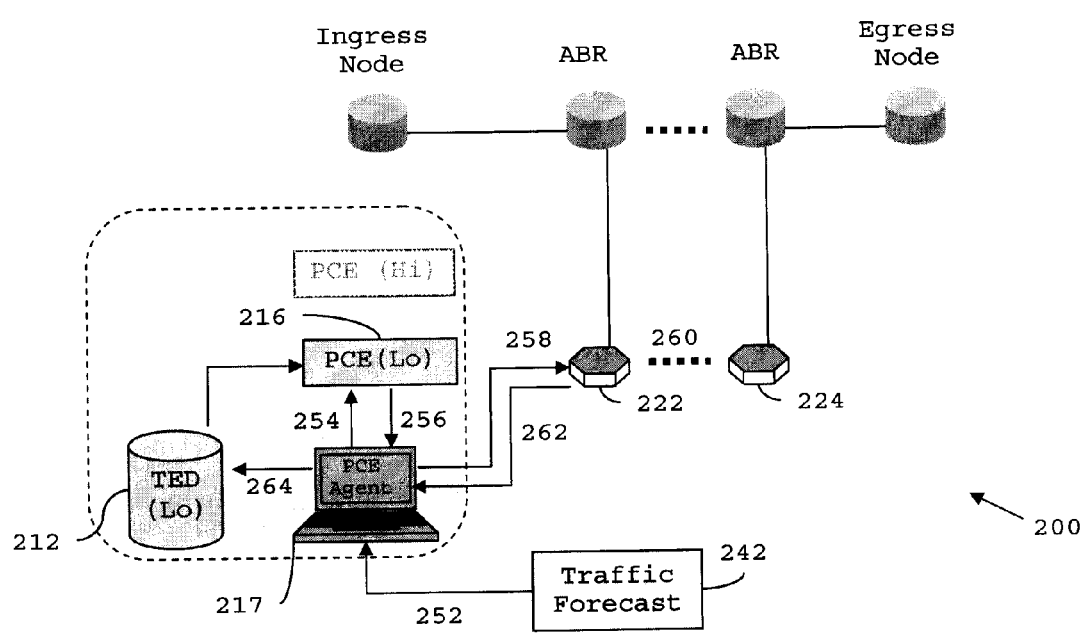
FIG. 2 depicts an embodiment of a static optical layer path provisioning mode in an optical transport network layer according to the present invention.

Reference is now made to FIG. 2, a diagram (200) illustrating an embodiment of a Static Optical Layer Path Provisioning (SOLLP) mode in an Optical Transport Network (OTN) layer.

The static path provisioning is basically a lower-layer specific function that establishes optical LSPs on a pre-establishment basis, before a higher-layer client LSP may request LSPs in the lower layer. In the distributed system architecture of the present invention, a PCE (Lo) (216) and a PCE Agent (217) play key roles in pre-establishing optical Traffic Engineering (TE) LSPs using a traffic demand matrix.

In step (252), traffic forecast data (242) arrives at PCE Agent (217) from a network planning system. PCE Agent (217) may be viewed as part of the network planning system. PCE Agent (217) sorts out traffic forecast data (242) to produce a point-to-point demand matrix, that maps to the optical network topology and available network resources.

Output of the sort-out may be a set of candidate LSPs, including ingress nodes, egress nodes, bandwidth, protection types, diversity requirements (e.g., link, node, or shared risk link group-SRLG) of protection paths for 1+1 protection, and etc. This output may be formulated in terms of a Global Concurrent Path Computation Request (GCPCReq) message to PCE (216).

A Global Concurrent Path Computation is referred to as a large-scale concurrent path computation, where a large number of TE paths are to be computed concurrently, in order to efficiently utilize network resources. A computation method involved with a large-scale concurrent path computation is referred to as global concurrent optimization.

In Step (254), PCE (216) receives a Global Concurrent Path Computation request (GCPCReq) from PCE Agent (217). PCE (216) solves a mathematical optimization problem to find an optimal solution, that meets global objective functions and global constraints, while satisfying each individual path constraint. A key constraint may be computing multiple paths concurrently, as opposed to computing path sequentially, which conventionally may result in sub-optimal use of resources. PCE (216) in this sense is a specialized high-capacity computing engine.

An optimal computation result is reported back to PCE Agent (217) by PCE (216) in the form of a Path Computation Reply (PCRep) message, in which each computed LSP is indicated. There are cases where the computation result is infeasible. Reasons for infeasibility may be memory issues, computational infeasibility, or other problems. PCE (216) may send the following information back to the PCE Agent (217) to indicate result of a global concurrent path computation request.

An indicator field indicates the outcome of the request. When the PCE could not find a feasible solution with the initial request, the reason for infeasibility should be indicated. Certain indicators should be supported, including: feasible solution found, mathematically infeasible, and memory overflow.

In step (256), PCE Agent (217) receives a path computation result from PCE (216). If the computation result from PCE (216) is infeasible, then PCE Agent (217) may stop the PCReq process at this point.

When PCE Agent (217) receives a path computation result indicating that the computation is infeasible (e.g., mathematically or memory overflow), PCE Agent (217) may try a different option under network policies. A policy option may be iterative path computation. Iterative path computation is a way to partition the one session of concurrent path computation requests (e.g., M total path computation requests) into N sessions (M>N), so that each session may require less computational burden than one single big session. This option may be exercised when a large scale optimization computation fails to find a feasible solution.

If PCE Agent (217) receives a successful result from PCE (216), then in step (258), for each feasible LSP computed by PCE (216), PCE Agent (217) may initiate a Generalized Multiprotocol Label Switching (GMPLS) Resource Reservation Protocol (RSVP) Path request to an optical gateway node (222) associated with the LSP.

In step (260), GMPLS signaling procedure may be proceeded, through downstream optical core nodes as prescribed as an Explicit Router Object (ERO) in a PATH message. When an optical gateway node (224) receives the PATH message, it sends back a RESV message to upstream.

In step (262), the RESV message arrives to PCE Agent (217) from optical gateway node (222) associated with the LSP. When a RESV message arrives from optical gateway node (222), an LSP establishment completes.

In step (264), PCE Agent (217) updates a TED (212) with the newly created LSP.

The same procedure may be repeated until all LSPs are established.

Figure 3:
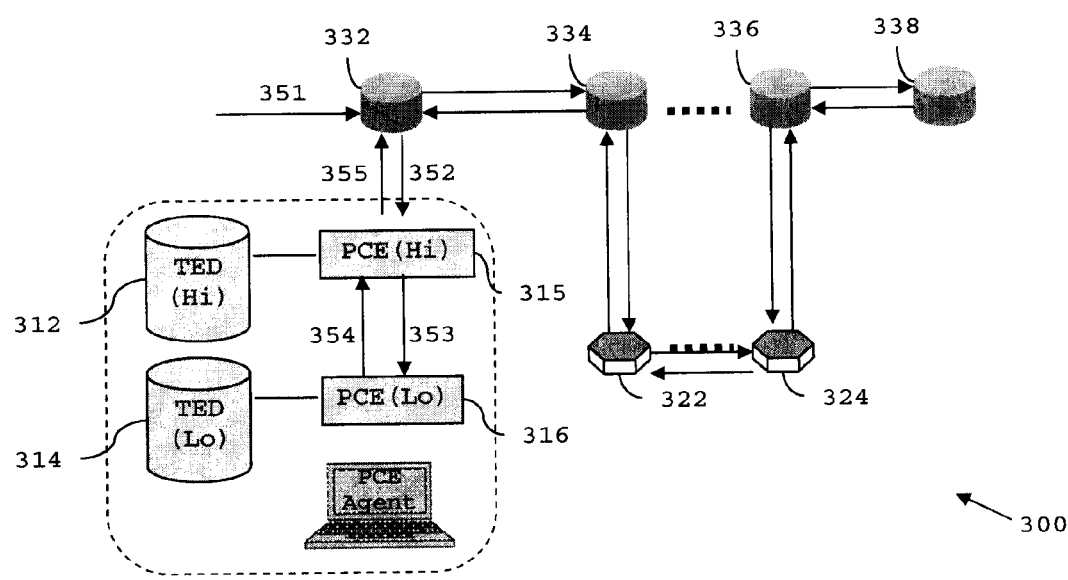
FIG. 3 depicts an embodiment of a dynamic multi-layer path provisioning mode according to the present invention.

FIG. 3 is a diagram (300) illustrating an embodiment of a Dynamic Multi-Layer Path Provisioning (DMLPP) mode. DMLPP is referred to as a multi-layer path provisioning process, that is triggered by a higher-layer dynamically to find an end-to-end LSP. DMLPP involves cooperative path computations between a PCE (Hi) (315) and a PCE (Lo) (316).

In step (351), Ingress Node (332) receives a signaling request to set up a PATH that ends at an Egress Node (338). Ingress Node (332) requests PCE (315) for an end-to-end path computation in step (352). In step (353), if PCE (315) determines that it does not have sufficient routing information for a lower-layer, a PATH Request message is triggered to PCE (316) for a lower-layer path computation. In step (354), PCE (316) may compute lower-layer path segments using a TED (Lo) (314), and report the computation result back to PCE (315). Upon receipt of a lower-layer path computed by PCE (316), PCE (315) formulates a multi-layer path, using a TED (Hi) (312), and sends the multi-layer path result back to Ingress Node (332) in step (355). Ingress Node (332), upon receipt of the end-to-end path result from PCE (315), proceeds signaling procedures using the computed path, passing through ABR (334), Optical Transport Network (OTN) (322), OTN (324), and ABR (336), reaching Egress Node (338), going back to Ingress Node (332), and establishing a multi-layer path.

Figure 4:
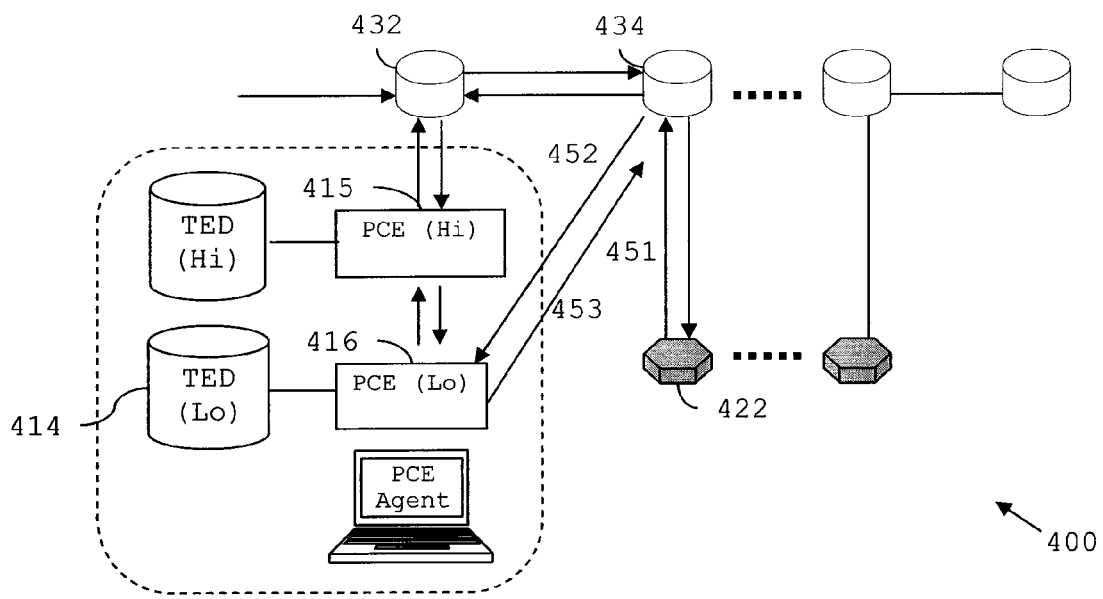
FIG. 4 depicts an embodiment of a crankback hold-off mode according to the present invention.

FIG. 4 is a diagram (400), illustrating an embodiment of process flows when a Crankback takes place in a Dynamic Multi-Layer Path Provisioning (DMLPP) mode.

A Crankback arises when a PCE (Hi) (415) successfully finds an end-to-end path with steps illustrated in FIG. 3, and an Ingress Node (432) proceeds with the path suggested by PCE (415) and PCE (Lo) (416). As a PATH message proceeds through an optical transport network (aka, lower layer network), one of the nodes in an O-LSP may send a crankback indicator in a PATH ERROR message back to an upper layer ABR (i.e., the optical LSP is no longer available for service or the committed bandwidth is not available for service). Upon receipt of the crankback indication, the first ABR node in the network, i.e., ABR (434), may have two choices to proceed. One choice is that the PATH ERROR may be sent to an upstream, and the path request may terminate. This is referred to as a normal crankback process. The second choice is that a PCReq may be sent to PCE (416), for a real-time path computation in the OTN, while holding off the crankback report to an upstream. The second choice is referred to as a Crankback Holdoff mode.

Under the Holdoff option, ABR (434) is allowed to request a path computation on the fly, before it proceeds with a normal crankback procedure. Normal crankback procedure is held off by ABR (434). When ABR (434) obtains a new light path from PCE (416), ABR (434) may try to set up a new path; otherwise, ABR (434) may proceed with the normal crankback process.

In step (451), an OTN (422) detects that an LSP request may not be accepted due to lack of resources, and sends a PATH ERROR message to ABR (434). ABR (434) (under policy) may request a new PCReq message to PCE (416) in step (452). PCE (416) computes a new light path using a TED (Lo) (414), and replies back to ABR (434) with a computed path in step (453). If under a normal signaling flow, ABR (434) may take a normal crankback procedure by sending a PATH ERROR message to an upstream.

Upon receiving a path report from PCE (416) in step (453), if a new light path is found, ABR (434) may proceed a PATH signaling to downstream with the new light path in the OTN. Otherwise, i.e., a new path is not found, a PATH ERROR message would proceed back to an upstream.

Crankback holdoff mode is beneficial in saving path setup time if successful. Path computation policies should allow ABRs to authorize a request to a lower-layer path computation on the fly (i.e., dynamically).

The previous description of the disclosed embodiments is provided to enable those skilled in the art to make or use the present invention. Various modifications to these embodiments will be readily apparent to those skilled in the art and generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A distributed Path Computation Element based (PCE-based) system in a multi-layer network, comprising:
   at least one higher-layer Path Computation Element (PCE);
   at least one lower-layer PCE;
   at least one higher-layer Traffic Engineering Database (TED) that provides relevant Traffic Engineering link information to the at least one higher-layer PCE;
   at least one lower-layer TED that provides relevant Traffic Engineering link information to the at least one lower-layer PCE; and
   at least one Path Computation Element Agent (PCE Agent) that manages off-line path computations without a request from the higher-layer PCE;
   wherein the at least one higher-layer PCE and the at least one lower-layer PCE function cooperatively for multi-layer path computations,
   wherein the PCE Agent is in communication with the lower-layer PCE and not in direct communication with the higher-layer PCE, and
   wherein the at least one lower-layer PCE is a physical layer PCE and the at least one higher-layer PCE is a non-physical layer PCE.

2. The system of claim 1, wherein the at least one higher-layer PCE provides packet layer Label Switched Paths (LSPs).

3. The system of claim 1, wherein the at least one lower-layer PCE provides optical layer LSPs.

4. The system of claim 1, wherein the at least one lower-layer PCE provides pre-established optical LSP information.

5. The system of claim 4, wherein the pre-established optical LSP information is requested by the at least one higher-layer PCE.

6. The system of claim 1, wherein the at least one lower-layer PCE provides dynamically a new light path computation.

7. The system of claim 6, wherein the new light path computation is requested by an Area Border Router (ABR) in the multi-layer network.

8. The system of claim 6, wherein the new light path computation is requested by an Autonomous System Border Router (ASBR) in the multi-layer network.

9. The system of claim 1, wherein the at least one PCE Agent provides path provisioning of a lower-layer LSP.

10. The system of claim 9, wherein the at least one PCE Agent initiates an LSP setup in a lower-layer.

11. The system of claim 9, wherein the path provisioning is driven by network planning.

12. The system of claim 9, wherein the at least one PCE Agent initiates a global concurrent path computation to the at least one lower-layer PCE using a traffic demand matrix.

13. The system of claim 1, wherein the at least one PCE Agent communicates with the at least one lower-layer PCE for computation of a lower-layer LSP.

14. The system of claim 13, wherein the at least one PCE Agent provides one of a point-to-point traffic matrix and a point-to-multi-point traffic matrix for point-to-multi-point applications.

15. The system of claim 13, wherein the at least one PCE Agent provides a global concurrent path computation request to the at least one lower-layer PCE.

16. The system of claim 13, wherein the at least one PCE Agent communicates with a PCE policy server to obtain decision parameters for a global concurrent path computation.

17. The system of claim 13, wherein the at least one PCE Agent provides an iterative path computation if an initial global concurrent path computation fails.

18. The system of claim 17, wherein the at least one PCE Agent partitions a plurality of concurrent path computation requests into multiple sessions; and correlates the multiple sessions.

19. The system of claim 1, wherein the at least one PCE Agent provides reconfiguration of lower-layer LSPs.

20. The system of claim 19, wherein the at least one PCE Agent provides an automatic reconfiguration detection mechanism.

21. The system of claim 20, wherein the automatic reconfiguration detection mechanism detects under-utilized optical LSPs using a periodic polling mechanism.

22. The system of claim 20, wherein the automatic reconfiguration detection mechanism detects well-performing optical LSPs using a periodic polling mechanism.

23. The system of claim 20, wherein a reconfiguration algorithm is run to determine candidates for reconfigured or re-optimized optical LSPs using the automatic reconfiguration detection mechanism.

24. The system of claim 20, wherein the automatic reconfiguration detection mechanism initiates a re-optimization path computation request to the at least one lower-layer PCE for under-utilized optical LSPs.

25. The system of claim 20, wherein the automatic reconfiguration detection mechanism provides constraints to the at least one lower-layer PCE in a path re-optimization computation request.

26. The system of claim 25, wherein the constraints comprise new objective functions, a list of paths to be re-optimized, and a list of paths that are not to be removed or changed.

27. The system of claim 1, wherein a static optical layer path provisioning mode is provided.

28. The system of claim 1, wherein a dynamic multi-layer path provisioning mode is provided.

29. The system of claim 1, wherein a crankback hold-off method is provided, the method comprising the steps of:
   an Area Border Router (ABR) requesting a new path computation to the at least one lower-layer PCE, upon detecting a crankback condition;
   the at least one lower-layer PCE providing a new light path; and the ABR proceeding path signaling using the new light path.

30. A distributed Path Computation Element based (PCE-based) system in a multi-layer network, comprising:
- at least one higher-layer Path Computation Element (PCE) that computes non-physical packet layer Label Switched Paths (LSPs);
- at least one lower-layer PCE that computes physical optical layer LSPs;
- at least one higher-layer Traffic Engineering Database (TED) that provides relevant Traffic Engineering link information to the at least one higher-layer PCE;
- at least one lower-layer TED that provides relevant Traffic Engineering link information to the at least one lower-layer PCE; and
- at least one Path Computation Element Agent (PCE Agent) that manages off-line path computations without a request from the higher-layer PCE;
- wherein the at least one higher-layer PCE and the at least one lower-layer PCE function cooperatively for multi-layer path computations; and
- wherein the at least one PCE Agent provides path provisioning of a lower-layer LSP, to communicate with the at least one lower-layer PCE for computation of a lower-layer LSP, and to provide reconfiguration of optical LSPs without being in direct communication with the higher-layer PCE.

\* \* \* \* \*

UNITED STATES PATENT AND TRADEMARK OFFICE
CERTIFICATE OF CORRECTION

PATENT NO. : 7,831,700 B2　　　　　　　　　　　　　　　　　　　　　　　　　Page 1 of 1
APPLICATION NO. : 11/549740
DATED : November 9, 2010
INVENTOR(S) : Young Lee It is certified that error appears in the above-identified patent and that said Letters Patent is hereby corrected as shown below:

Title page under item (74) Attorney, Agent, or Firm should read: "Conley Rose, P.C.; Grant Rodolph".

Signed and Sealed this

Twenty-first Day of December, 2010

David J. Kappos
*Director of the United States Patent and Trademark Office*